June 8, 1965
W. A. McMULLIN
3,188,255
METHOD OF MAKING PRIMARY METERING ELEMENTS
WITH REINFORCED SYNTHETIC PLASTIC
Filed June 6, 1962
2 Sheets-Sheet 1
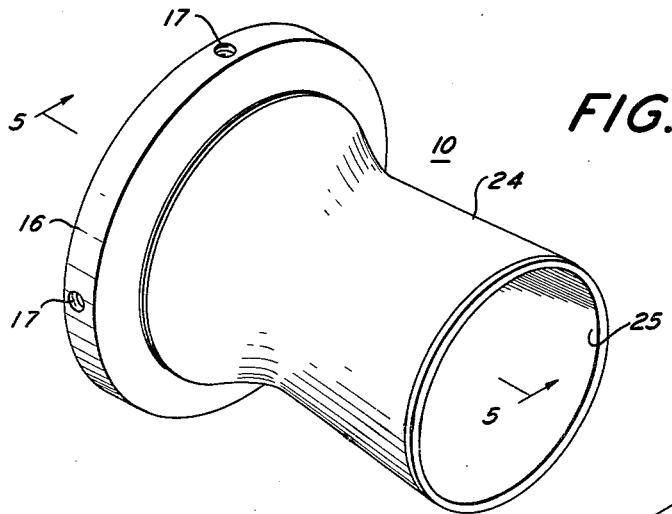
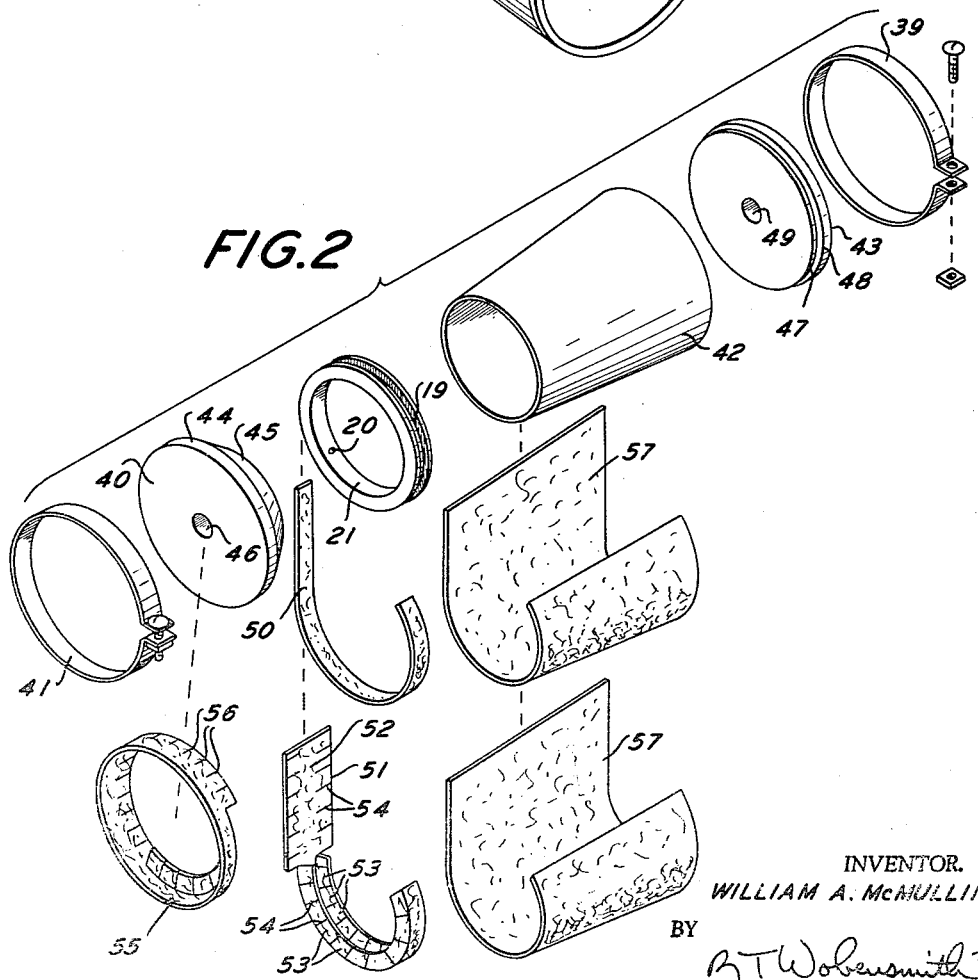
INVENTOR.
WILLIAM A. McMULLIN
BY
B T Wolkensmith 2nd
ATTORNEY June 8, 1965 W. A. McMULLIN 3,188,255
METHOD OF MAKING PRIMARY METERING ELEMENTS
WITH REINFORCED SYNTHETIC PLASTIC
Filed June 6, 1962 2 Sheets-Sheet 2
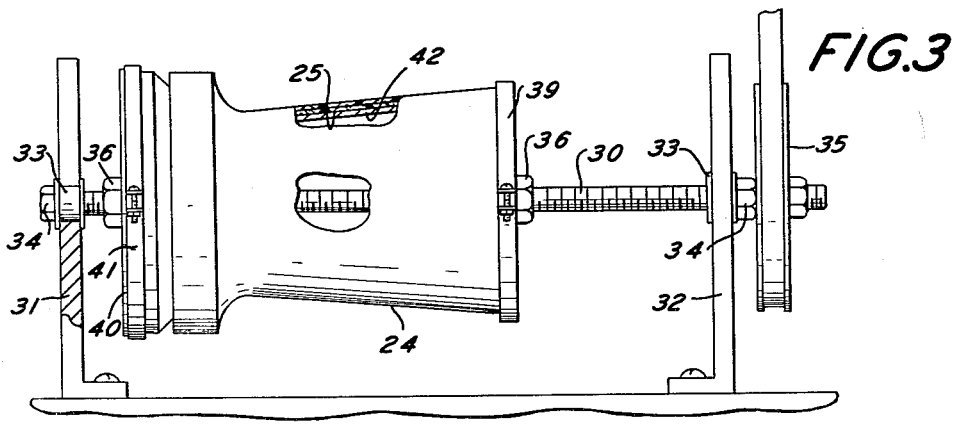
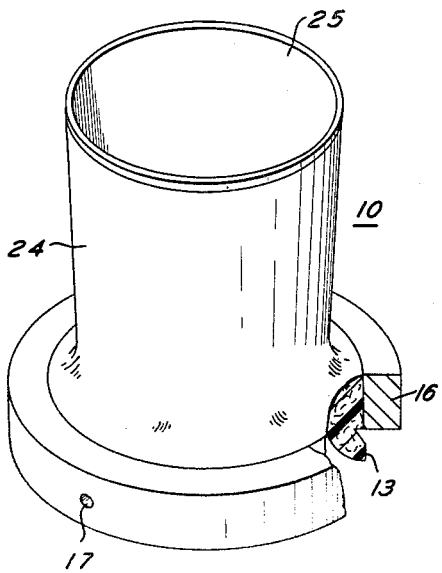
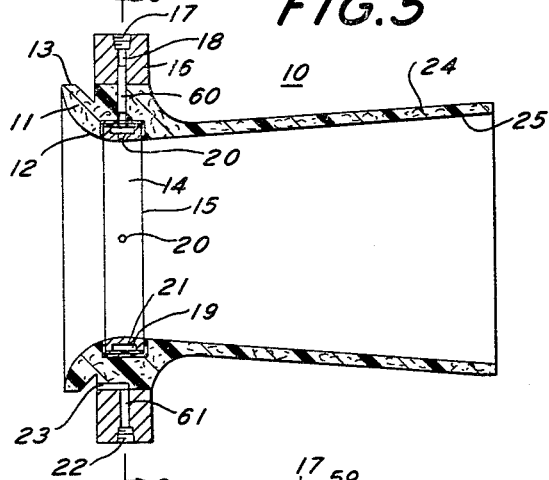
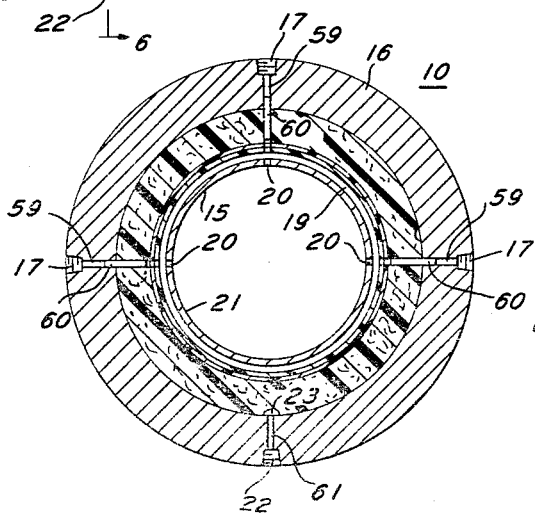
INVENTOR.
WILLIAM A. McMULLIN
BY B.T.Wolbensmith
ATTORNEY United States Patent Office 3,188,255
Patented June 8, 1965

3,188,255
METHOD OF MAKING PRIMARY METERING ELEMENTS WITH REINFORCED SYNTHETIC PLASTIC
William A. McMullin, Philadelphia, Pa., assignor to Penn Meter Company, Philadelphia, Pa., a corporation of Pennsylvania
Filed June 6, 1962, Ser. No. 200,427
4 Claims. (Cl. 156—189)

This invention relates to the fabrication of primary metering elements for fluid flow and more particularly to methods of making such elements with reinforced synthetic plastic as the major component.

It has heretofore been customary to make primary metering elements for measuring fluid flow, and particularly those known as venturi tubes, of metal. Such elements require a satisfactory surface for contact by the fluid and proper shaping to carry out their functions of fluid flow constriction and recovery.

The multitudes of sizes required to meet different rates of flows in primary metering devices necessitates a large number of patterns for production and this, as well as the inventory required, makes the cost higher than would otherwise be the case.

Various attempts have been made to construct primary metering elements of synthetic plastic materials but these have not proven wholly satisfactory either from the viewpoint of manufacture or from the viewpoint of the finished product.

It is the principal object of the present invention to provide improved methods for the production of primary metering devices for fluid flow which will be simple to carry out, will not require expensive equipment but which will result in a high quality product.

It is a further object of the present invention to provide improved methods for the production of primary metering elements which can be carried out by relatively unskilled workers but with which a high quality product will be obtained.

It is a further object of the present invention to provide a primary metering element which will be relatively light in weight, and of materials which are free from likelihood of corrosion and of adequate strength.

Other objects and advantageous features of the invention will be apparent from the description and claims.

The nature and characteristic features of the invention will be more readily understood from the following description taken in connection with the accompanying drawings forming part hereof, in which:

FIGURE 1 is a view in perspective of a primary metering element made by the methods of the present invention;

FIG. 2 is an exploded perspective view showing the first group of components and mandrel parts for the primary metering element of FIG. 1;

FIG. 3 is a view in elevation illustrating the assembly of the primary metering element of FIG. 1; parts being broken away to show the details of construction;

FIG. 4 is a perspective view showing the primary metering element partially completed;

FIG. 5 is a longitudinal sectional view of the completed primary metering device; and FIG. 6 is a transverse sectional view taken approximately on the line 6—6 of FIG. 5.

It should, of course, be understood that the description and drawings herein are illustrative merely and that various modifications and changes can be made in the structure and methods disclosed without departing from the spirit of the invention.

Like numerals refer to like parts throughout the several views.

Referring first to FIGS. 1, 5 and 6, where the completed primary metering device is shown at 10, the same includes an entrance section 11 having an interior curved surface 12 and an outer rim 13.

The primary metering device also includes a throat or restricted section 14 with which surface 12 is tangential. The throat section 14 has a metallic throat ring 15 of bronze or other suitable material forming part thereof. Surrounding the ring 15, a mounting ring or flange 16 is provided having pressure taps 17 communicating through radial passageways 18 with an annular connecting groove 19 in the ring 15 from which drilled piezometer openings or holes 20 extend in intersecting relation to the inner surface 21 of the ring 15. Additional upstream pressure taps 22 are provided with passageways 23, 61 extending therefrom to the upstream side of the flange 16.

A recovery section 24 is provided having an interior surface 25 which is tangential with respect to the surface 21 of the ring 15.

In accordance with the invention component parts are assembled on a composite mandrel, the component parts including parts which enter into the final primary metering element. The assembled construction has a curable, or controlled self-curing, plastic incorporated therewith or applied thereto, and supporting portions of the mandrel are removed. The exterior mounting ring or flange 16 then is ready for installation of the metering element with the interior configuration completed.

Referring now more particularly to FIGS. 2 and 3 of the drawings, a rotatable shaft 30 is provided and is supported in end support plates 31 and 32 by bearing members 33 and held by positioning nuts 34. A pulley 35 may be provided, driven from a motor (not shown) through a speed reducer (not shown) for rotating the shaft 30 at the desired slow speed of rotation. The shaft 30 is threaded, between the end support plates 31 and 32, for the reception of holding nuts 36.

Mounted on the shaft 30, a composite mandrel assembly is provided which, from left to right in FIGS. 2 and 3, includes an inlet section forming head 40 an inlet forming clamp strap 41, a throat ring 15 which is part of the finished primary metering element, a recovery section interior forming sleeve 42, an outlet end head 43 and an outlet forming clamp strap 39.

The mandrel assembly is assembled on the shaft 30 and is held in assembled sequential and abutting secured relation by the holding nuts 36 on the threaded portion of the shaft 30 in engagement with the ends of the heads 40 and 43.

The inlet section forming head 40, which can be made of hardwood, at the periphery has a cylindrical outer face 44 on which the strap 41 is engaged in overlapping relation to a curved entrance section forming surface 45. The surface 45, which forms the surface 12, tangential at one side to the inner surface 21 of the throat ring 15, extends to the throat ring 15 so that the surface 21 in itself serves as part of the completed primary metering element. The head 40 has a central opening 46 for the shaft 30.

The sleeve 42 is preferably made as a frusto conical metal sleeve, extends at one end to the inner surface 21 of the throat ring 15 to form the surface 25 tangential to the surface 21. The sleeve 42 is carried at its opposite end on a smaller diameter rim portion 47 on the outlet end head 43. The head 43 also has a larger diameter rim portion 48 on which the clamp strap 39 engages in overlapping relation to contiguous portions of the sleeve 42 to limit and control the shape of the primary metering element at this location. The end head 43 has a central opening 49 for the shaft 30.

With the composite mandrel assembly in position on the shaft 30, and with the faces of the ring 15 coated first with a suitable catalytic paint and then with lacquer to facilitate subsequent bonding of synthetic resinous plastic, a covering strip 50 of glass fibers in mat form and saturated with synthetic resinous plastic is wrapped around the exterior of the ring 15 in enclosing relation to the groove 19. A second synthetic resinous plastic saturated elongated covering strip 51 with a flat central section 52 and side sections 53 with slits 54 extending inwardly from the side margins is wrapped circumferentially around the strip 50 with its side sections 53 turned inwardly.

An additional covering ring 55 of glass fibre mat saturated with synthetic resinous plastic and with slits 56 extending from its inner edge to facilitate bending and shaping is placed around the inlet section forming head surface 44 and in overlapped relation over the surface 45 and overlapped or in meeting relation to one of the side sections 53.

One or more segmental strips 57 of glass fibre mat saturated with synthetic resinous plastic are wrapped around the exterior of the sleeve 42, preferably in partially overlapped relation to the other side section 53.

Dependent upon the synthetic resinous plastic employed, mounting ring 16, which can be of metal, is then assembled to the periphery and radially outwardly in alignment with the ring 15 and secured in position with a compatible adhesive.

The ring 16, prior to assembly, is preferably provided with a plurality of radial holes 59 and connecting sleeves or liners 60 are inserted therein to facilitate subsequent operations. At least one radial hole 61 is also provided for an upstream pressure connection. The liners 60 preferably are placed in their final positions prior to the application of resin at those locations.

Various types of synthetic resinous plastic may be employed, dependent in part upon the size of the element, the fluids to be handled, and other considerations. For certain types of installations, a heat cured epoxy resin is preferred while for other types of installations the resin can have a curing agent and catalyst therewith to determine the speed of curing.

The resinous plastic as previously indicated can be employed to saturate the glass fiber mats. Additional plastic can be applied in viscous or semi-viscous form to the exterior of the assembled components including the mats, on the composite mandrel assembly.

After the completion of the cure, the synthetic resinous plastic impregnates and is reinforced by the glass fiber mats or coverings. The holes 59 and 61 can be drilled to complete the openings inwardly of the liners 60 to insure access of pressure from the groove 19 and access through the hole 61.

The holes 59 and 61 can be and preferably are also tapped, at this time, for the connection of threaded pressure take off connections, and for the insertion of closure plugs (not shown) into those holes which are not employed.

The methods heretofore described are particularly suited for carrying out the objects of the invention and the facile production of primary metering elements of desired size and shape.

I claim:

1. The method of making a primary metering element for fluid flow which comprises rotatably mounting with respect to a support in sequential abutting secured relation an inlet section forming head having a converging exterior peripheral surface, a throat ring, a recovery section forming sleeve having a diverging exterior peripheral surface, and an outlet end head, said first head and sleeve having said exterior surfaces disposed to provide with an inner face of the ring, a continuous elongated interior surface of the element, applying resinous plastic saturated fibrous reinforcing coverings in surrounding engaging relation to said surface of said first head, said ring and said surface of said sleeve, curing said resinous plastic reinforced by said coverings, separating the heads, the sleeve and the support from the element and securing a mounting flange outwardly of said throat ring.

2. The method as defined in claim 1 in which said throat ring has preformed piezometer openings.

3. The method as defined in claim 1 in which said throat ring has preformed piezometer openings and an annular connecting groove, and openings are formed in said flange communicating with said groove.

4. The method as defined in claim 1 in which said coverings are formed of glass fibers, said coverings are partially applied after being saturated with the resinous plastic and said coverings are separately applied on said throat ring, said first head and said sleeve.

References Cited by the Examiner
UNITED STATES PATENTS

| | | | |
|---|---|---|---|
| 2,284,761 | 6/42 | Nathan | 29—157 XR |
| 2,312,579 | 3/43 | O'Brien | 29—474.4 |
| 3,003,020 | 10/61 | Miller | 156—189 |
| 3,027,746 | 4/62 | Kappel | 138—40 XR |
| 3,041,036 | 6/62 | McFarland. | |

EARL M. BERGERT, *Primary Examiner.*